No. 895,438. PATENTED AUG. 11, 1908.
C. B. DELANY.
PNEUMATIC CHUCK.
APPLICATION FILED MAR. 16, 1908.

Witnesses
Benj Finckel
Alice B. Cook

Inventor
Charles B. Delany
by Finckel & Finckel
his Attorneys

UNITED STATES PATENT OFFICE.

CHARLES B. DELANY, OF COLUMBUS, OHIO.

PNEUMATIC CHUCK.

No. 895,438.                 Specification of Letters Patent.            Patented Aug. 11, 1908.

Application filed March 16, 1908. Serial No. 421,450.

*To all whom it may concern:*

Be it known that I, CHARLES B. DELANY, a citizen of the United States, residing at Columbus, in the county of Franklin and State of Ohio, have invented a certain new and useful Improvement in Pneumatic Chucks, of which the following is a specification.

The object of this invention is to make improvements in chucks for lathes whereby they are operated and adjusted with greater facility and used with greater convenience.

The invention is embodied in the features of construction hereinafter described and pointed out in the appended claims.

Figure 1:
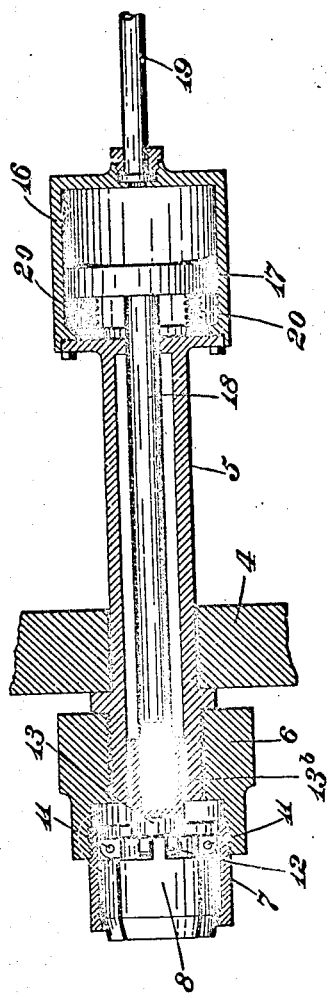
Figure 3:
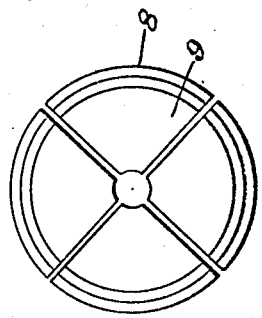
Figure 2:
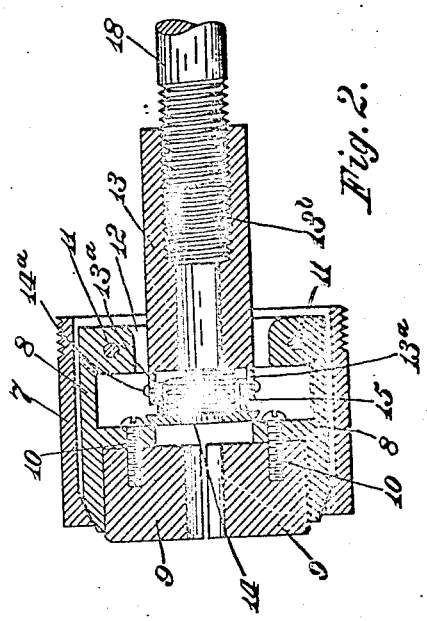

In the accompanying drawings illustrating one instance of the invention—Figure 1 is mainly a central longitudinal sectional view with some parts left in full; Fig. 2 is a detail of the chuck jaws and contiguous parts; Fig. 3 is an end view looking to the right Fig. 2.

In the views 4 designates the head stock in which turns the tubular mandrel 5. At its left-hand end the tubular mandrel is externally threaded to receive the inner portion of the chuck socket 6 and said portion 6 is internally threaded to receive the outer portion of the chuck socket 7. The outer portion 7 is internally inwardly tapered at its outer end to contract the chuck jaws when they are thrust outward in the chuck socket.

8 designates chuck-bearing levers to which work-holding jaw blocks 9 are secured by screws 10. Different sizes of jaw blocks can therefore be used. The levers 8 are pivoted, as seen at 11, on ears 12 of a shank 13. The left-hand or outer end of the shank 13 is socketed and is furnished with a sliding head 14 with rounded edges, said head being backed by a spring 15 that presses the head against the jaw levers and tends to spread said lever and the jaw block asunder. The head 14 is held slidingly in place by means of small screws 14ª which work in slots 13ª in the shank 13. The right-hand or inner end of the shank 13 is made with a threaded socket 13ᵇ.

The right-hand end of the tubular mandrel 5 has bolted to it a pneumatic or fluid-pressure cylinder 16 containing a piston 17 having a rod 18 that extends into the tubular mandrel 5. The left-hand end of the rod 18 is threaded to be adjustably engaged by the threaded socket 13ᵇ. The degree of opening of the jaws upon retraction of the rod 18 can therefore be nicely regulated. The piston takes pressure at its right-hand side through a pipe 19 swiveled in a suitable manner, or as shown, to the cylinder. At its left-hand side the piston is pressed by springs 20. Fluid pressure on the piston thus holds the chuck jaws on the work and the springs 20 in conjunction with the spring-pressed head 14 release the chuck jaws from the work when the fluid pressure on the piston is exhausted. Any suitable form of valve, not shown, for admitting pressure to and exhausting it from the said cylinder can be provided. It will thus be observed, first, that fluid pressure is used in holding the work only; second, that springs not only move the jaws longitudinally in the socket but also spread and hold them asunder ready for the insertion of work, and third, that the extent of movement of the jaws with reference to the socket can be nicely regulated.

What I claim and desire to secure by Letters Patent is:

1. In a chuck, the combination of the chuck socket having a jaw-contracting end, jaw levers in said socket, a longitudinally movable shank to which said jaw levers are pivoted, and means between said shank and the jaw levers tending to spread the jaws asunder.

2. In a chuck, the combination of the chuck socket having a jaw-contracting end, jaw levers in said socket, a longitudinally movable shank to which said jaw levers are pivoted, and a spring-pressed head between said shank and the jaw levers.

CHARLES B. DELANY.

Witnesses:
JAMES STRADER,
BENJ. FINCKEL.